US011924596B2

(12) United States Patent
Menzinger et al.

(10) Patent No.: US 11,924,596 B2
(45) Date of Patent: Mar. 5, 2024

(54) SYSTEM AND METHOD FOR ACOUSTICALLY TRANSPARENT DISPLAY

(71) Applicant: BARCO N.V., Kortrijk (BE)

(72) Inventors: José Ramón Menzinger, Erfurt (DE); Ronny Van Belle, Lendelede (BE); Daniel De Caster, Kruishoutem (BE)

(73) Assignee: BARCO N.V., Kortrijk (BE)

( * ) Notice: Subject to any disclaimer, the term of this patent is extended or adjusted under 35 U.S.C. 154(b) by 273 days.

(21) Appl. No.: 17/311,860

(22) PCT Filed: Dec. 21, 2018

(86) PCT No.: PCT/EP2018/086816
§ 371 (c)(1),
(2) Date: Jun. 8, 2021

(87) PCT Pub. No.: WO2020/126060
PCT Pub. Date: Jun. 25, 2020

(65) Prior Publication Data

US 2022/0021958 A1 Jan. 20, 2022

(51) Int. Cl.
*H04R 1/02* (2006.01)

(52) U.S. Cl.
CPC ......... *H04R 1/028* (2013.01); *H04R 2499/15* (2013.01)

(58) Field of Classification Search
CPC .............. G02B 27/0172; G02B 6/0053; G02B 6/0061; G02B 6/0028; G02B 6/0018; G02B 27/0101; G02B 6/0043; G02B 6/0036; H04R 1/028; H04R 1/02; H04R 2499/15; G06T 11/60; G06F 3/048; G06F 3/00; G06F 3/1446; G09G 5/14; G09G 2340/0407; G09G 2370/20; G09G 5/30; G09G 3/20; G09G 3/006; G09G 2330/10
See application file for complete search history.

(56) References Cited

U.S. PATENT DOCUMENTS

| | | | |
|---|---|---|---|
| 2010/0272306 A1 | 10/2010 | Hoogenstraaten | |
| 2011/0248935 A1 | 10/2011 | Mellow et al. | |
| 2012/0082332 A1 | 4/2012 | Park | |

(Continued)

FOREIGN PATENT DOCUMENTS

| | | |
|---|---|---|
| KR | 1020110054972 A | 5/2011 |
| WO | 2010140811 A1 | 12/2010 |

OTHER PUBLICATIONS

International Search Report and Written Opinion issued in PCT/EP2018/086816, dated Aug. 14, 2019, 12 pages provided.

(Continued)

*Primary Examiner* — Carolyn R Edwards
*Assistant Examiner* — Julie X Dang
(74) *Attorney, Agent, or Firm* — HAMRE, SCHUMANN, MUELLER & LARSON, P.C.

(57) ABSTRACT

A system and method for providing visual and acoustical signals that includes a light emitting display having light sources and a display surface, and perforations extending perpendicularly to the display surface and disposed between the light sources, at least one loudspeaker positioned behind the light emitting display. The perforations have a non-cylindrical shape. The openings on the side of the light sources occupies at least 5% of the area of the light emitting display for sound passing through.

18 Claims, 10 Drawing Sheets

(56) References Cited

U.S. PATENT DOCUMENTS

| | | | | |
|---|---|---|---|---|
| 2013/0094126 | A1* | 4/2013 | Rappoport | G09G 3/3208 361/679.01 |
| 2015/0136521 | A1* | 5/2015 | Swinkels | G10K 11/172 181/290 |
| 2017/0026726 | A1* | 1/2017 | Kim | H04R 9/06 |
| 2017/0164081 | A1 | 6/2017 | Buisker et al. | |
| 2018/0074375 | A1* | 3/2018 | Koito | G02F 1/133504 |

OTHER PUBLICATIONS

Second Written Opinion issued in PCT/EP2018/086816, dated Nov. 3, 2020, 9 pages provided.

* cited by examiner

SYSTEM AND METHOD FOR ACOUSTICALLY TRANSPARENT DISPLAY

The present invention relates to a system comprising an acoustically transparent display screen and a loudspeaker positioned immediately behind the display. The system can be configured to enable an optimal route for the acoustic signal to pass the display screen. The present invention also relates to a method of constructing or operating an acoustically transparent display screen and a loudspeaker positioned immediately behind the display.

BACKGROUND

The present invention pertains to the field of light emitting displays that are also acoustically transparent. Loudspeakers can be placed behind the light emitting display and the sound can be transmitted through the display. Acoustically transparent displays can be implemented by foreseeing openings between the light sources where the sound can be transmitted. WO2010140811A1 discloses a sound penetrating display apparatus that has holes disposed between the pixels of the display panel. US20170164081A1 discloses an audio and display system having a housing wherein an audio speaker can be placed.

SUMMARY OF THE INVENTION

It is an objective of the present invention to provide a system comprising an acoustically transparent display screen and a loudspeaker positioned immediately behind the display. The system can be configured to enable an optimal route for the acoustic signal to pass the display screen. It is an objective of the present invention to provide a method of constructing or operating an acoustically transparent display screen and a loudspeaker positioned immediately behind the display.

Loudspeakers can be designed to provide a lambertian radiation distribution of the acoustic signal. This is an angle independent distribution which can avoid that the acoustic signal has high quality in only a very limited area (or volume) in front of the loudspeaker(s).

When using perforated projection screens (without intrinsic light source), the loudspeaker can be placed behind the projection screen. This has the advantage that the sound reaching the audience is independent of where the audience is located relative the loudspeaker (or how they turn their heads relative the loudspeaker). Since a perforated projection screen is non-rigid, it can vibrate with the acoustic signal.

A display screen built on an electronic board, such as a PCB, will involve a structure that is too rigid to admit such a resilient behavior.

One solution is to put the loudspeakers around the display. Using a control system it is possible to manipulate the acoustic signals from the multiple loudspeakers placed around the screen, and make them be heard as they where placed in their original position (behind the screen), but there may be phase differences that can be heard if a listener e.g. turns his/her head, and this kind of manipulation will be valid only for a reduced part of the audience area. Additionally, there is a need to allocate space next to the display to house the multiple loudspeakers.

Another alternative is to use a wave field solution, however this requires a large amount of loudspeakers (e.g. 80), which results in a monetary costly, bulky and complex system.

If the loudspeaker is placed too far behind the display screen, a remarkable amount of energy will be diffracted and/or reflected towards the room behind the screen, this energy don't reach the audience, or in the worse case it will reach the audience in an uncontrolled manner, which can cause degradation of the audio quality (e.g. attenuation, distortion).

The present invention enables a preservation of such angle independent distribution of the acoustic signal when the loudspeaker is placed behind the display screen.

Embodiments of the present invention provide a system for providing visual and acoustical signals, comprising a light emitting display having light sources and a display surface, and perforations extending perpendicularly to the display surface and disposed between the light sources, and at least one loudspeaker positioned behind the light emitting display, wherein the perforations comprise a non-cylindrical shape and the openings on the side of the light sources occupy at least 5% of the area of the light emitting display for sound passing through. The advantage of this system is that a better sound reproduction and distribution can be achieved.

The amount of open surface caused by the perforations, can be smaller on the side of the light sources than on the counter side. This has the advantage of reducing should reflection at the back of the display.

The perforations can have a truncated cone shape. This has the advantage of reducing should reflection at the back of the display and being economical to manufacture.

The perforations can have different shapes such as a concave shape or a convex shape or non-circular openings.

The perforations can have at least two sections with different shapes. For example the at least one perforation section can have a truncated cone shape or the at least one perforation section can have a concave shape or the at least one perforation section can have a convex shape or the at least one perforation section can have a non circular opening.

Embodiments of the present invention can provide a system for providing visual and acoustical signals, comprising a light emitting display having light sources and a display surface, and perforations extending perpendicularly to the display surface, the perforations comprise a conical shape and are disposed between the light sources, at least one loudspeaker having a displacement amplitude and a frequency range of 5 to 30 kHz, wherein the at least one loudspeaker is placed immediately behind the display so that when it is positioned at its maximum displacement amplitude, it is in contact with the display.

The amount of open surface caused by the perforations, can be smaller on the side of the light sources than on the counter side. This creates a reduced optical impact on the side viewed by the viewers.

The perforations can have a truncated cone shape or have non circular openings.

The perforations shape can have at least two sections with different shapes.

Embodiments of the present invention can provide a system for providing visual and acoustical signals, comprising a light emitting display having light sources, and perforations extending perpendicularly to the display surface, the perforations comprise a conical shape and are disposed between the light sources, at least one loudspeaker having a displacement amplitude and a frequency range of 0.1 kHz to less than 5 kHz, wherein the at least one loudspeaker is placed immediately behind the display so that when it is positioned at its maximum displacement amplitude, it separated from the display by 1 mm to 15 cm.

The amount of open surface caused by the perforations, is smaller on the side of the light sources than on the counter side.

The perforations can have a truncated cone shape.

Embodiments of the present invention can provide a method for providing visual and acoustical signals, using a light emitting display having light sources and a display surface, and perforations extending perpendicularly to the display surface and disposed between the light sources, wherein the perforations comprise a non-cylindrical shape and the openings on the side of the light sources occupy at least 5% of the area of the light emitting display for sound passing through, further comprising placing at least one loudspeaker behind the light emitting display.

Embodiments of the present invention can also provide a method for providing visual and acoustical signals, comprising a light emitting display having light sources and a display surface, and perforations extending perpendicularly to the display surface, the perforations comprise a conical shape and are disposed between the light sources, the method comprising placing at least one loudspeaker immediately behind the display, the at least one loudspeaker having a displacement amplitude so that when it is positioned at its maximum displacement amplitude, this is in contact with the display, the at least one loudspeaker emitting sound at a frequency range of 5 to 30 kHz.

Embodiments of the present invention can provide a system for providing visual and acoustical signals, comprising a light emitting display having light sources, a display surface and perforations extending perpendicularly to the display surface, the perforations comprising a conical shape and are disposed between the light sources, at least one loudspeaker having a displacement amplitude and a frequency range of 0.1 kHz to less than 5 kHz, wherein the at least one loudspeaker is placed immediately behind the display so that when it is positioned at its maximum displacement amplitude, it separated from the display by 1 mm to 15 cm.

DEFINITIONS

A "display screen" can be a light emitting image forming device comprising light sources and electronics.

A "light source" can in the present context be a solid state light source, e.g. LED, OLED, AMOLED, Chip on board (COB).

A "loudspeaker" or "speaker" can comprise one or more "drivers" housed in a speaker enclosure. A driver can transform an electrical signal into an acoustic signal, within a defined frequency range. A driver can comprise a lightweight diaphragm that when put into motion initiates a sound wave in the surrounding medium. The diaphragm is often cone shaped, but for e.g. electrostatic or magnetostatic loudspeakers, the diaphragm can be flat.

A "pitch" can be defined as the repetitive distance between the center points of two objects that are equally distanced. It can also refer to the overall geometrical distribution of the objects, e.g. if the objects are positioned at the corners of squares, it can be referred to as a square pitch.

The "acoustic transparency index" can be defined as $$TI=nd^2/ta^2=0.04P/\pi ta^2$$

where:

n=number of perforations per sq in;

d=perforation diameter (in);

t=sheet thickness (in);

a=shortest distance between holes (in); a=b−d, where b=on-center hole spacing (in);

P=percent (not fractional) open area of sheet (*ACOUSTICAL USES FOR PERFORATED METALS: Principles and Applications*, Theodore J. Schultz)

DETAILED DESCRIPTION

Figure 1:
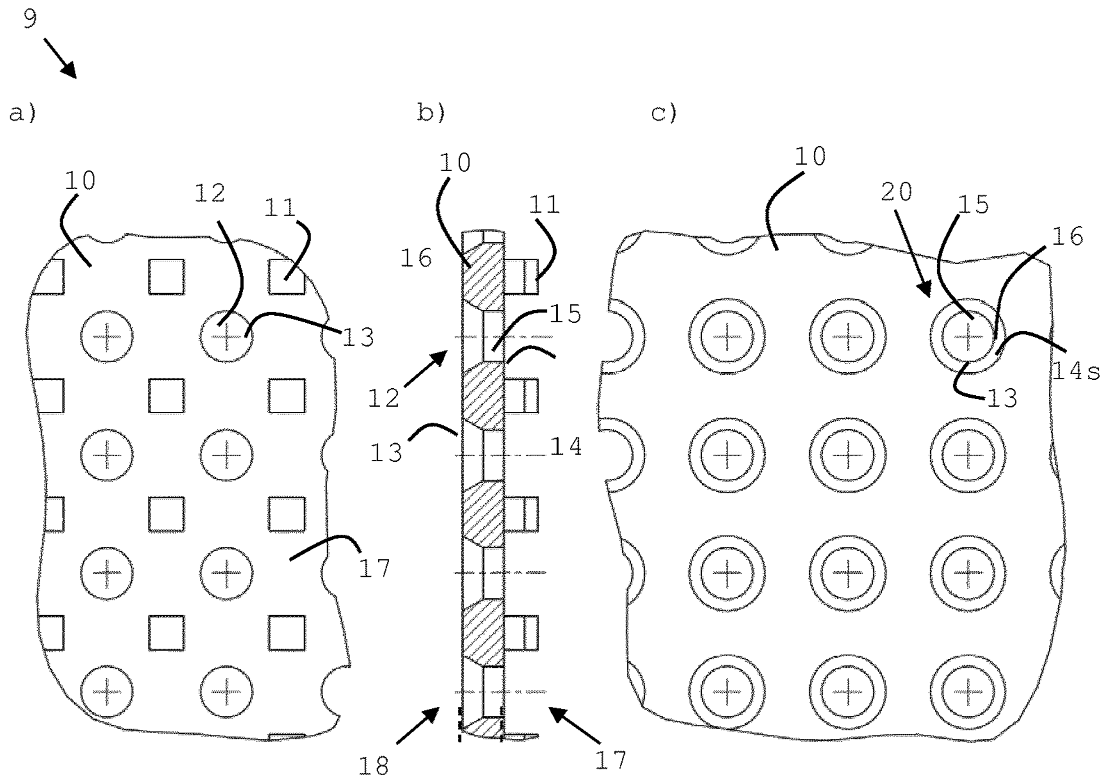
FIGS. 1*a*) to *c*) show different views of an embodiment of the present invention comprising a display screen with perforations.

FIG. 1 shows an embodiment of the present invention comprising a display device 9. FIG. 1*a*) illustrates the front side of the display device comprising a PCB 10 which can have a light source 11 (out of many light sources) disposed across the front side 17 and a perforation 12 (out of many perforations) having diameter 13. FIG. 1*b*) illustrates a cross-sectional side-view of the PCB 10, the light source 11 and the perforation 12. The perforation 12 can have a cylindrical opening 15 on the front side 17 and a conical opening 16 on the backside 18 so that the diameter 14 of the perforation on the backside can be larger on the diameter 13 of the perforation on the front side. FIG. 1*c*) illustrates the backside of the PCB 10, which can have a perforation 20 with a cylindrical opening 15 with diameter 13 and a conical opening 16 having diameter 14 on the backside surface and diameter 13 inside the PCB.

Figure 2:
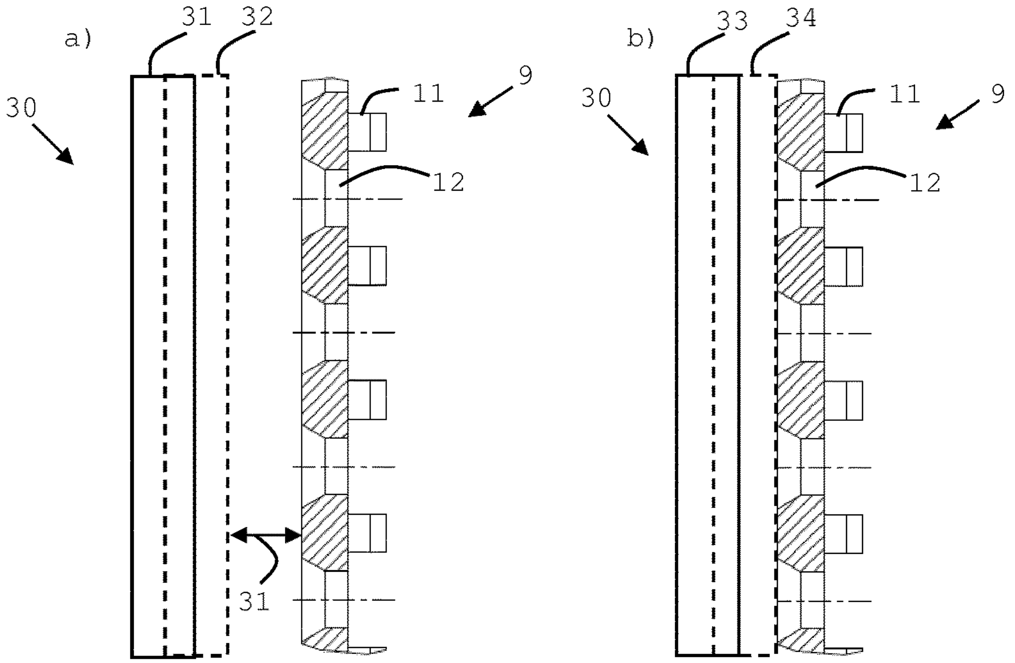
FIGS. 2*a*) and *b*) show an embodiment of the present invention comprising a display screen and a loudspeaker in different positions.

FIG. 2 shows embodiments of the present invention comprising the display screen 9 and a loudspeaker 30. The loudspeaker 30 can provide an acoustic signal in the frequency range of 8 Hz to 30 kHz. FIG. 2*a*) shows an embodiment where the loudspeaker 30 (i.e. the most protruding part of it) can adopt position 32 at its maximal amplitude, in reference to its initial position 31. The loudspeaker can be positioned so that there is still a separation 31 to the display screen 9 at the maximal amplitude. This could be, for example, 0 mm to 50 cm, 0 mm to 15 cm or 0 mm to 2 cm.

FIG. 2*b*) shows another embodiment where the loudspeaker 30 (i.e. the most protruding part of it) can have an initial position 33 and a second position 34 at its maximal amplitude. The loudspeaker 30 can be positioned so that it is in contact with the display screen 9 at its maximal amplitude.

An advantage of the situation in FIG. 2*b*) can be that the loss of energy in the acoustic signal can be kept low. Such configuration can be appropriate for acoustic signals in first human hearable frequency range extended a certain range above (e.g. 85 Hz to 30 kHz). However, in the case of bass speaker membranes (typically placed without cover behind the screen) it can be disadvantageous to let the loudspeaker 30 come in contact with the display screen 9. The sound quality will be negatively impacted and the electronics of the loudspeaker may be damaged. On the other hand, for all acoustical frequencies, if the distance 31 is larger than 50 cm, the system may suffer from unwanted acoustical reflectance.

The conical shape of the perforations can be advantageous since it can reduce the reflected part of the incoming acoustic signal, as illustrated in FIG. 3*b*). FIG. 3*a*) shows a cylindrical perforation where the footprint of the perforation radius primarily decides how much of the acoustic signal that can be transmitted. FIG. 3*b*) shows a perforation having a cylindrical finishing so that the perforation radius is larger on the side of the backside of the display screen so that a larger part of the acoustic signal can be received. FIG. 3*a*) shows a part of a perforated screen 40 comprising a substrate 41 and/or 44, light sources 42, 43 and perforations 45, 46. The incoming acoustical signal 47 will be partly reflected 48 and partly transmitted 49. FIG. 3*b*) has, mutatis mutandis, corresponding features. The difference between FIGS. 3*a*) and 3*b*) is that the perforation in FIG. 3*a*) has a cylindrical shape and a conical shape that meet at depth 145. The perforation in FIG. 3*b*) is cylindrical.

Figure 3:
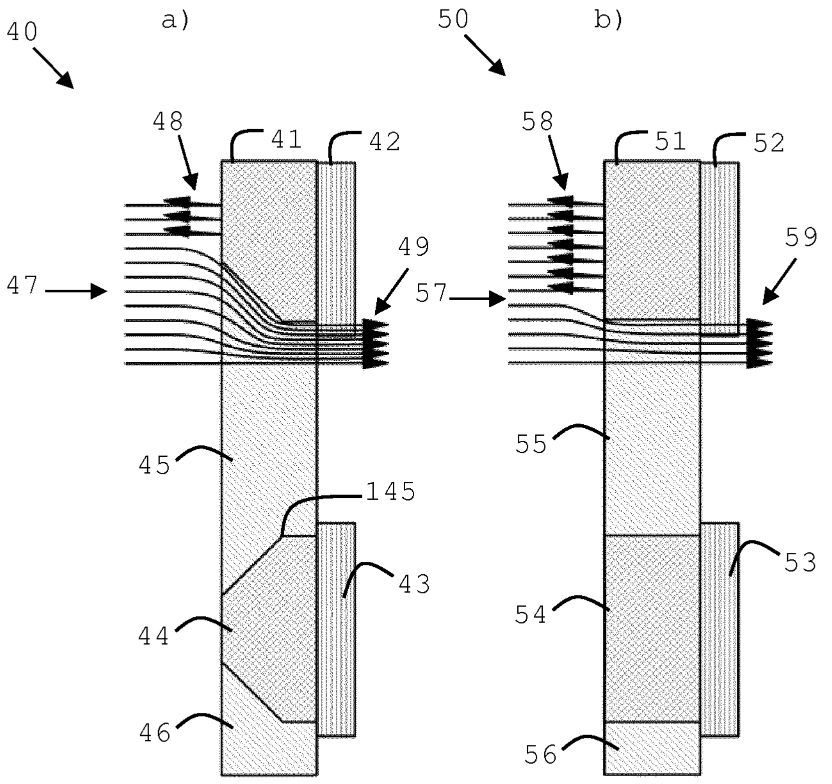
FIGS. 3*a*) and *b*) show an embodiment of the present invention comprising the acoustical signal transmitted through a conical perforation.

The conical shape of the perforation can be advantageous since it can reduce the reflected part 48 of the incoming acoustic signal 47, as illustrated in FIG. 3: The reflected part 48 in FIG. 3*a*) is smaller than the reflected part 58 in FIG. 3*b*). FIG. 3*b*) shows a cylindrical perforation 55 where the footprint of the perforation radius primarily decides how much of the acoustic signal that can be transmitted. FIG. 3*a*) shows a perforation 45 having a cylindrical finishing so that the perforation radius is larger on the the backside of the display screen (where the acoustical signal 47 is first received). In this way, a larger part of the acoustic signal can be received and transmitted 49 through the perforation, compared to the transmitted part 59 for the cylindrical perforation in FIG. 3*b*).

FIGS. 4*a*) to *c*) show other embodiments of the present invention. FIG. 4*a*) is a view from the side where the acoustic signal is received. FIGS. 4*b*) to *c*) show cross-sectional side views of different cone shaped perforations.

Figure 4:
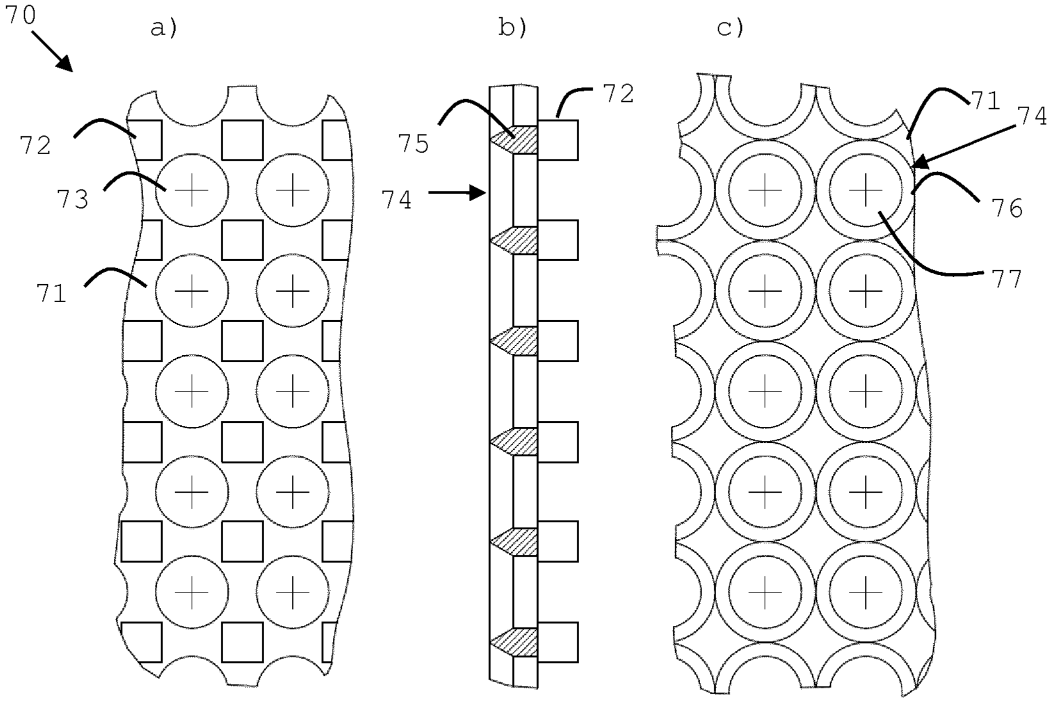
FIGS. 4*a*) to *c*) show different views of an embodiment of the present invention.

FIG. 4 shows an embodiment of the present invention comprising a perforated screen 70 shown in FIG. 4*a* as seen from the front side (towards a viewer), FIG. 4*b* in a cross-sectional side view and FIG. 4*c* from the backside. The front-side in FIG. 4*a* comprises a substrate 71, a light source 72 and a perforation 73. The side view in FIG. 4*b* comprises a light source 72, the substrate 75 and a perforation 74. The backside in FIG. 4*c* comprises the substrate 71 and a perforation 74 having a larger radius 77, and a smaller radius 74 which is located at a depth inside the substrate. The perforations in FIG. 4 cover a larger part of the substrate area than e.g. those in FIG. 1.

In another embodiment of the present invention the perforations may be filled with an acoustically transparent material.

The size of the light sources may be 0.005 mm-3 mm.

The pitch of the light sources may be 0.4 mm-20 mm.

The diameter of the perforations can be 0.2-20 mm, and the pitch of the perforations can be 0.4-100 mm, depending on the diameter. The depth of a perforation can be 2 cm or smaller.

The shape of the perforations can be circular or noncircular. The latter having rounded or straight corners (depending on the manufacturing possibilities)

The perforations can also have a convex or concave shape. The shape of the perforations can be designed to reach an open surface ratio of 10% or more, this ratio is calculated on the LED side of the PCB (towards the audience). The open surface ratio is the total area of all perforations divided by the total area of the LED board.

One exemplary embodiment comprises the present invention being implemented as tiled modules which can be attached to a metal frame. Each module can comprise a PCB board, light sources, e.g. LED's, on side facing the audience and the electronics driving the light sources on the other side. The electronics can be placed so that it covers the smallest surface portion on the PCB.

Perforations can be distributed regularly over the PCB board surface between the light sources and in various layouts. For example in a square pitch and optionally closer to each other in the horizontal or vertical direction.

Alternatively, the holes can be distributed irregularly while preserving a locally uniform density distribution.

Such embodiment would further cancel out any phasing artefacts, mostly perceivable at the side positions in the front row.

A concrete example of such a uniform distribution is the Poisson disk distribution. Such distribution is known to de-correlate discrete frequency peaks and will thereby diffuse interference artefacts causing a "harsh" sound at certain positions.

The density of the holes must be substantially constant for any small fraction of the screen.

Depending on the dimensions of the screen, a good approximation for such an arrangement is the jittered displacement of a regular grid.

Similarly, direction specific constructive interferences can be reduced by varying the drilling depth with a conical(-like) drill, as this will introduce subtle frequency dependent sound pressure variations comparable to the effect of a jittered regular grid, which is known to approximate the ideal Poisson disk distribution very well.

All techniques described above reduce potential electromagnetic radiation, as the Poisson-distributed grid cancels out all potential constructive interferences which could be present with a regularly aligned micro-antenna-array.

The perforations can be drilled in a shape having wider diameter in the back side than on the front side of the PCB being the perforation divided in two sections: the conical section and the cylindrical section. The conical section started on the back side of the PCB board and ends at a certain distance between the back side and the front side of the board (intersection point). From this intersection point to the front the perforation remains cylindrical (cylindrical section).

The conical section started on the back side of the PCB board and ends in the front side of the board being the whole perforation conical.

Additionally, an extra layer of plastic material can be attached on the back side of the PCB acting as a sound wave guide. This sound wave guide should optimize and enlarge the shape of the perforations drilled in the PCB, so more sound energy is gently bend to the perforation opening in the front of the LED board.

The size of the openings on the front side of the PCB can be designed to reach at least 10% of the PCB surface to be open for sound to pass through.

The LED's can be mounted on the PCB to the front (i.e. towards the audience) also in a square regular pitch but shifted to the intersections between holes (for an optimal relationship between opening radius and LED distribution).

The PCB board and the LED's can be designed and mounted together to allow the thickness not to be larger than 2 mm.

The present invention can obtain an acoustic transparency index similar or higher than a common cinema projection screen. Such screen is reflecting or transmitting light instead of being intrinsically light emitting.

A cinema speaker can be placed behind it and the audience can hear the cinema sound with the same quality (or better) than by using a conventional projection screen.

The acoustical response from different screens were measured, using standard cinema screen speakers. The measuring microphones were placed in front of the speakers, and different types of perforated samples were placed between the speaker and the microphones, as illustrated in FIG. 5.

Figure 5:
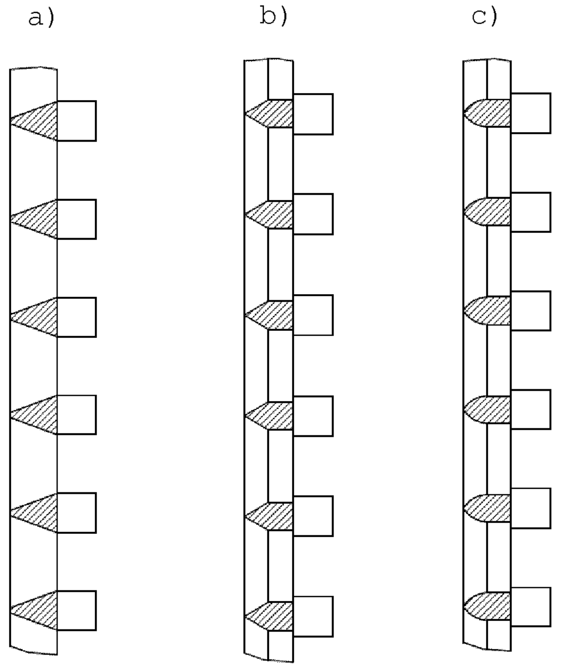
FIGS. 5*a*) to *c*) show embodiments of the present invention comprising different perforation shapes.

FIG. 5 shows different embodiments of the present invention where the perforations have various shapes, namely FIG. 5*a*) conical, FIG. 5*b*) cylindrical and conical (as described above) and FIG. 5*c*) cylindrical and "rounded" conical. The "rounded" conical shape can be described as e.g. trumpet- or clarinet-like. Note, however, that in embodiments of the present invention, the sound enters at the larger opening.

Figure 6:
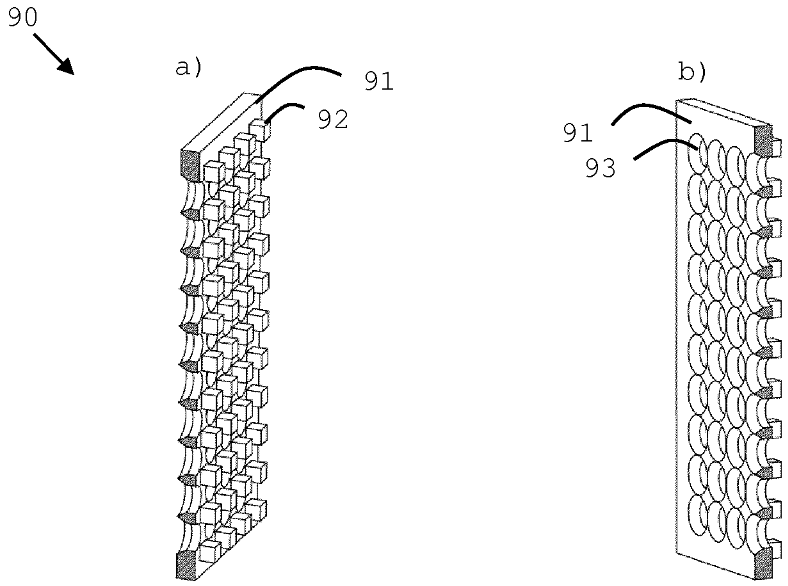
FIG. 6*a*) to *b*) show different views of an embodiment of the present invention.

FIG. 6 shows three-dimensional perspective view of an embodiment of the present invention, comprising FIG. 6*a*) a front side view and FIG. 6*b*) a back side view of a perforated screen. The front side view in FIG. 6*a*) comprises a substrate 91 and a light source 92, and the back side view in FIG. 6*b*) comprises the substrate 91 and a perforation 93.

Figure 7:
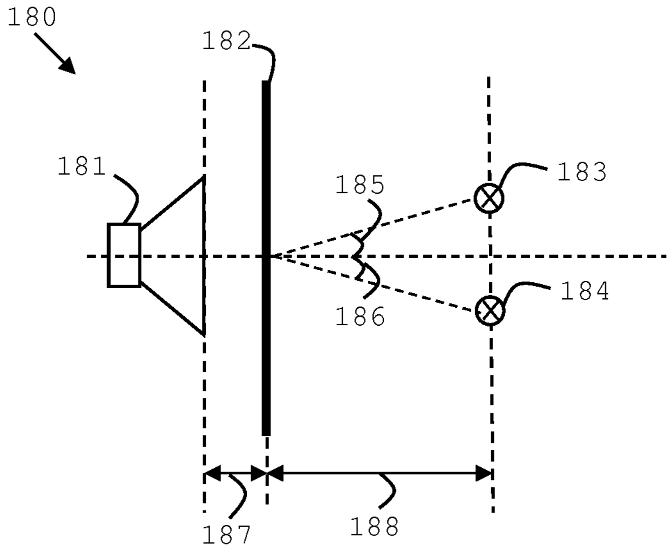
FIG. 7 shows an embodiment of the present invention comprising a test set-up.

The acoustical response from different screens can be measured, using one or more loudspeakers. FIG. 7 shows an exemplary test set-up 180 comprising microphones 183 and 184 placed to receive an acoustical signal in front of the screen 182 at a distance 188 and angles 185 and 186, respectively. For each test run a different configuration of the screen 182 can be put between the loudspeaker 181 and the microphones 183, 184 as illustrated in FIG. 7. In test set-ups the screen 182 can be placed with a distance 187 to the loudspeakers. Alternatively the distance 187 can be zero. The loudspeaker 61 may be replaced with a multiple of loudspeakers.

For each measurement a reference signal was first measured, and FIGS. 8 to 13 illustrate graphs with the differences between a reference measurement and the measurement of a certain test set-up. The x-axis shows the frequency range in Hz, and the y-axis shows the horizontal angle in degrees. On the right side is a scale for the absolute magnitude in decibel. The full line inside a graph indicates a horizontal angle for 0 degrees, and the dotted line indicates a horizontal angle of 45 degrees.

The screens tested were: A conventional projection screen, a perforated LED board with perforation area of 12%, a perforated LED board with perforation area of 20%.

Figure 8:
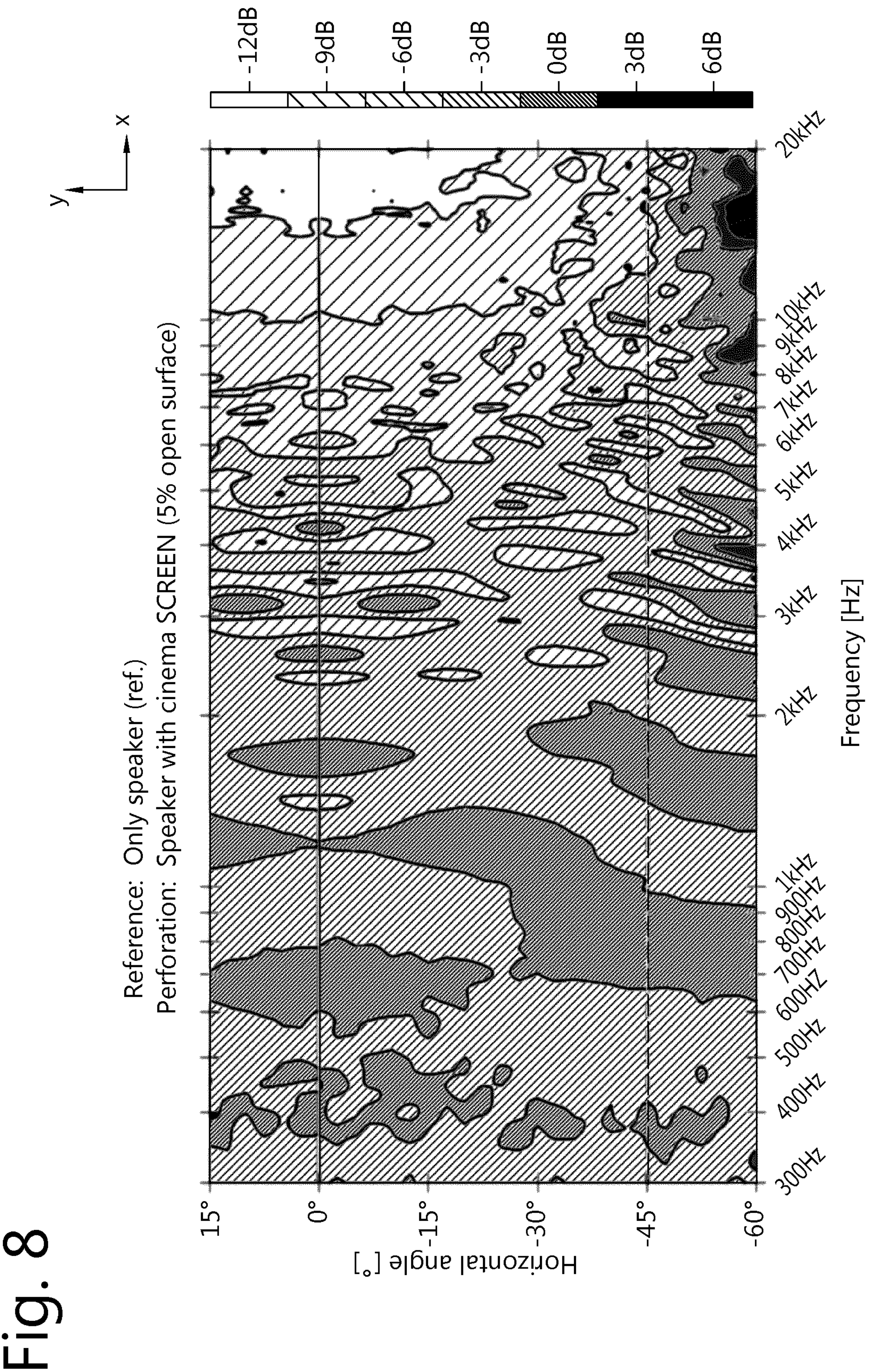
FIGS. 8 to 13 show graphs from acoustical measurements of embodiments of the present invention.

FIG. 8 shows the difference in the acoustic signal when recorded directly from the speaker, and through a conventional projection screen. The projection screen has 5% open surface.

Between 0 degrees and −45 degrees the screen attenuation increases continuously with the frequency.

Figure 9:
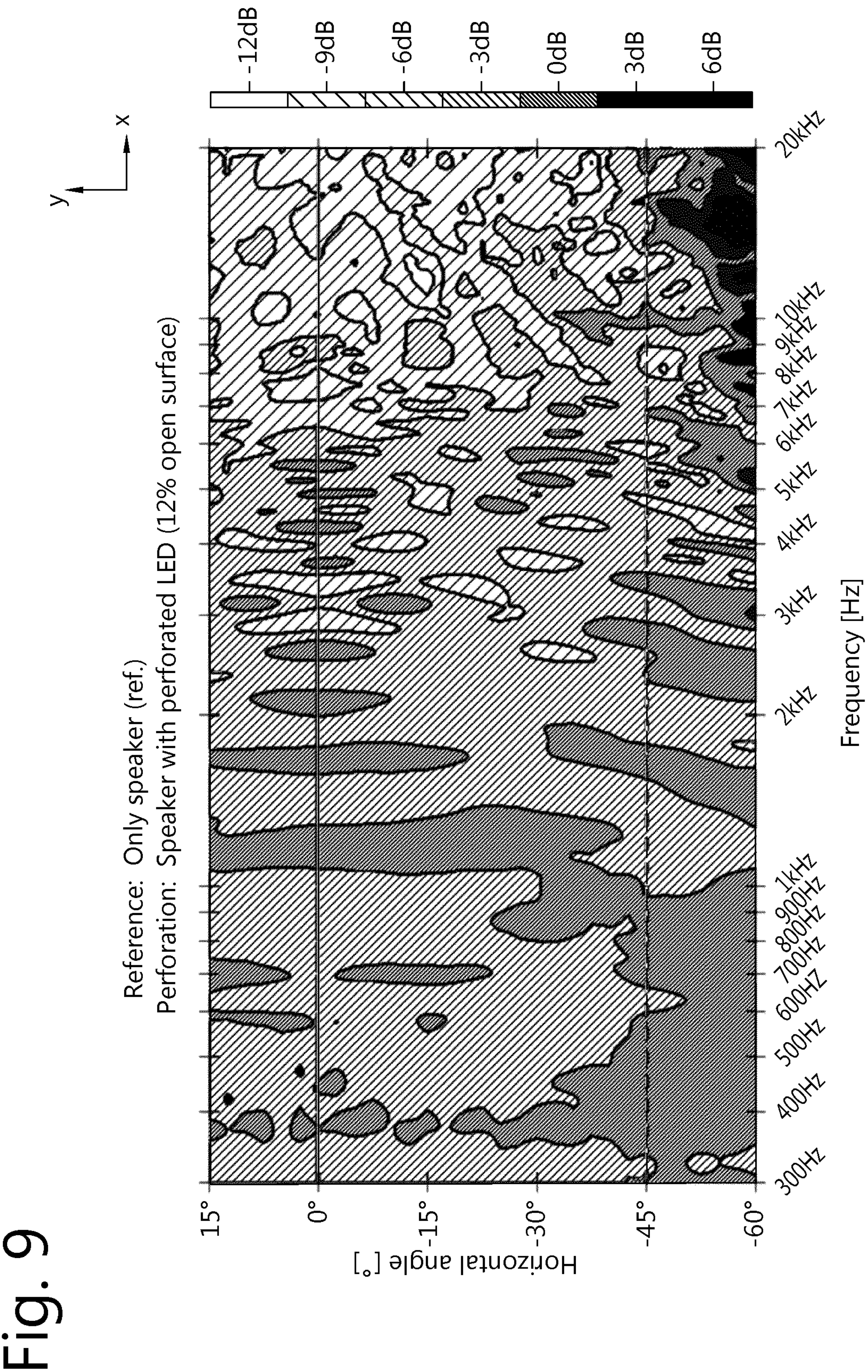

FIG. 9 shows the difference in the acoustic signal when recorded directly from the speaker, and through a perforated LED board whit 12% open surface ratio. The attenuation increases continuously with the frequency up to −45 degrees. This perforation performs slightly better than the projection screen.

Figure 10:
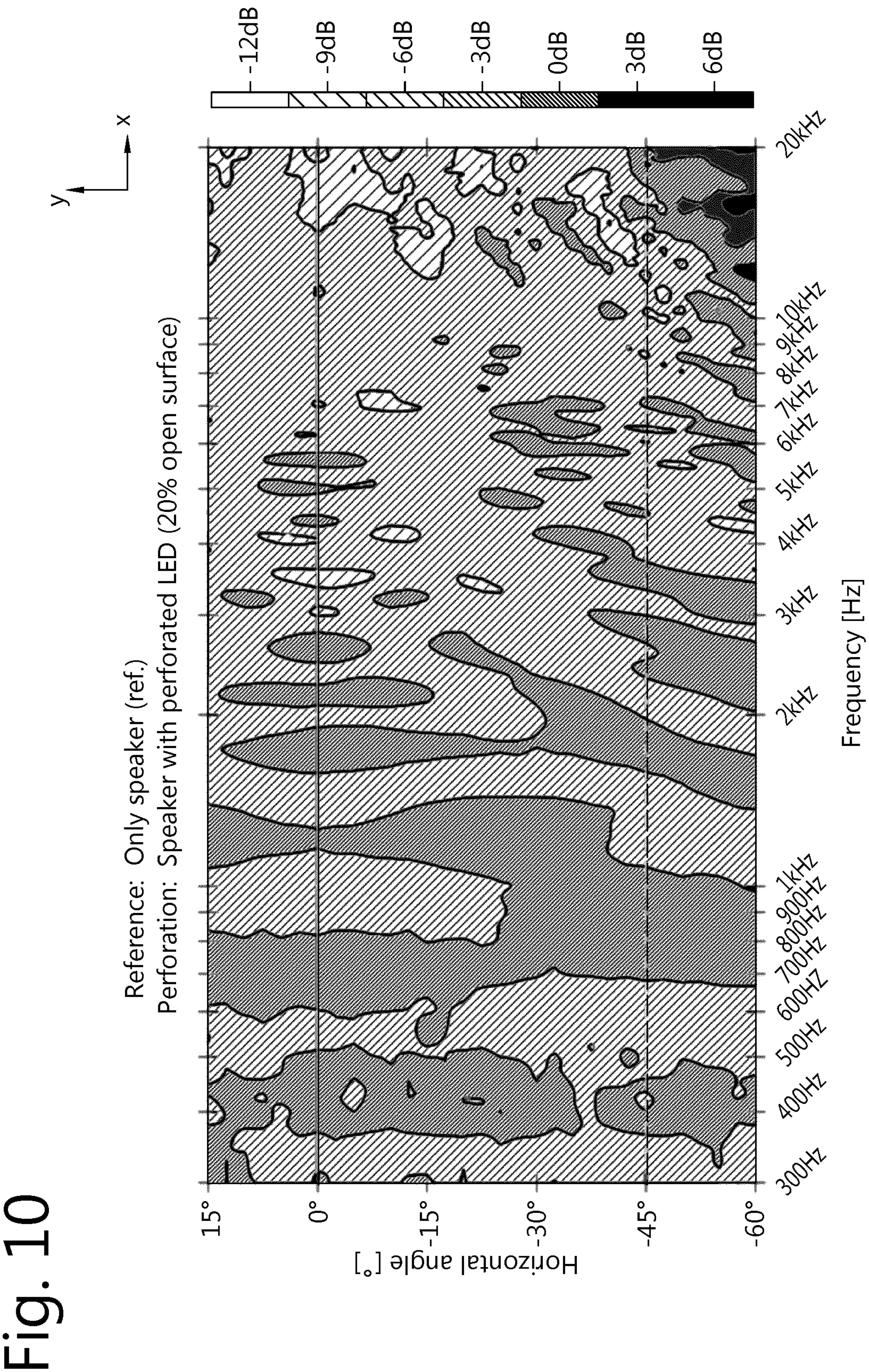

FIG. 10 shows the difference in the acoustic signal when recorded directly from the speaker, and through a a perforated LED board whit 20% open surface ratio. Up to −45°: There is a slight attenuation increase along the frequency spectrum up to 45 degrees. This sample performs remarkably better than the perforated LED board in FIG. 8.

Figure 11:
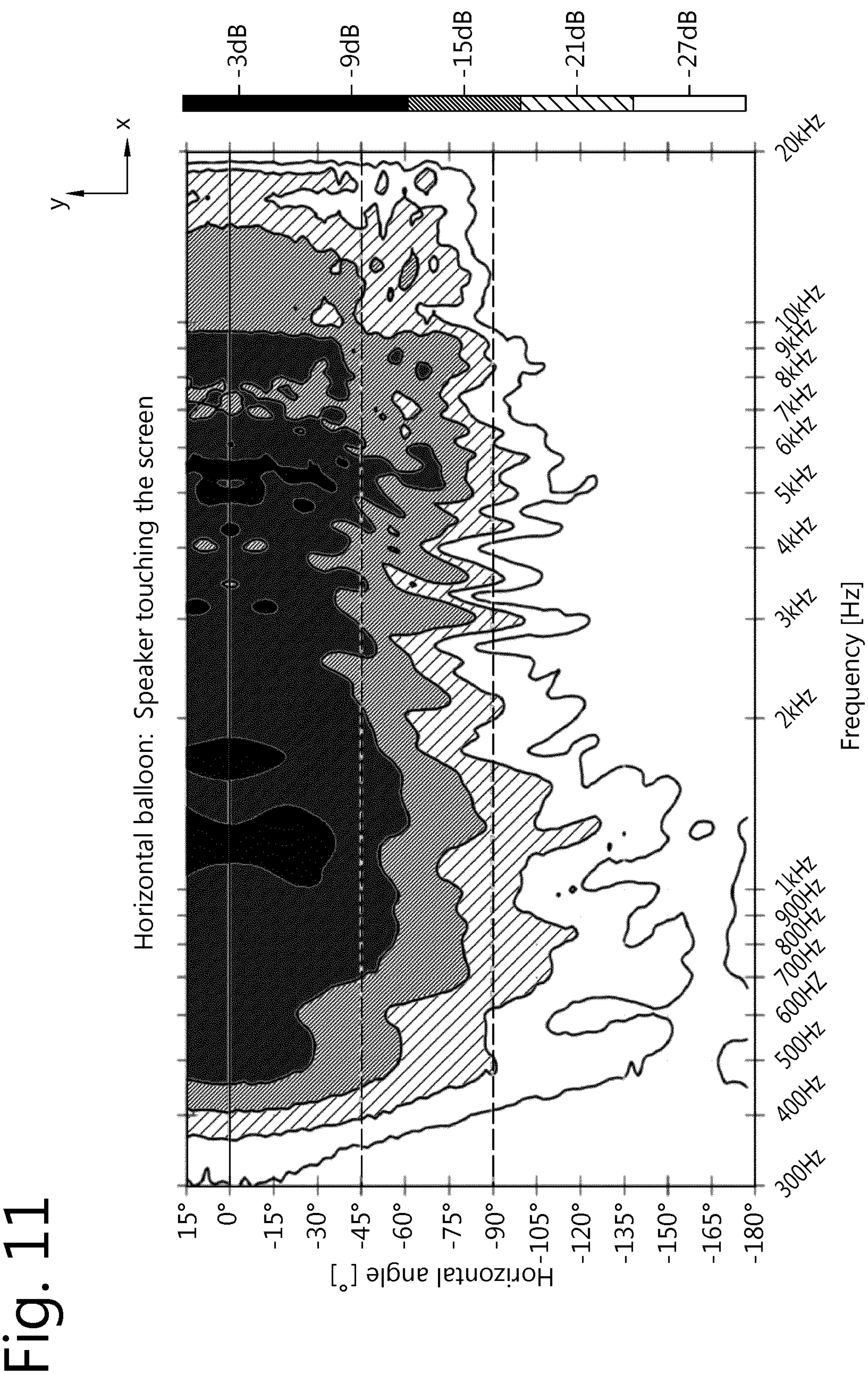

FIG. 11 shows the normalized horizontal radiation balloon (absolute magnitude spectrum) of the speaker when the distance between the speaker and the perforated standard cinema screen was 0 cm. The speaker has a nominal horizontal coverage of ±45°, and FIG. 11 shows a wider energy spread from −45° up to 60°/75°. This dispersion effect of the screen is caused by diffraction on the small perforations.

Figure 12:
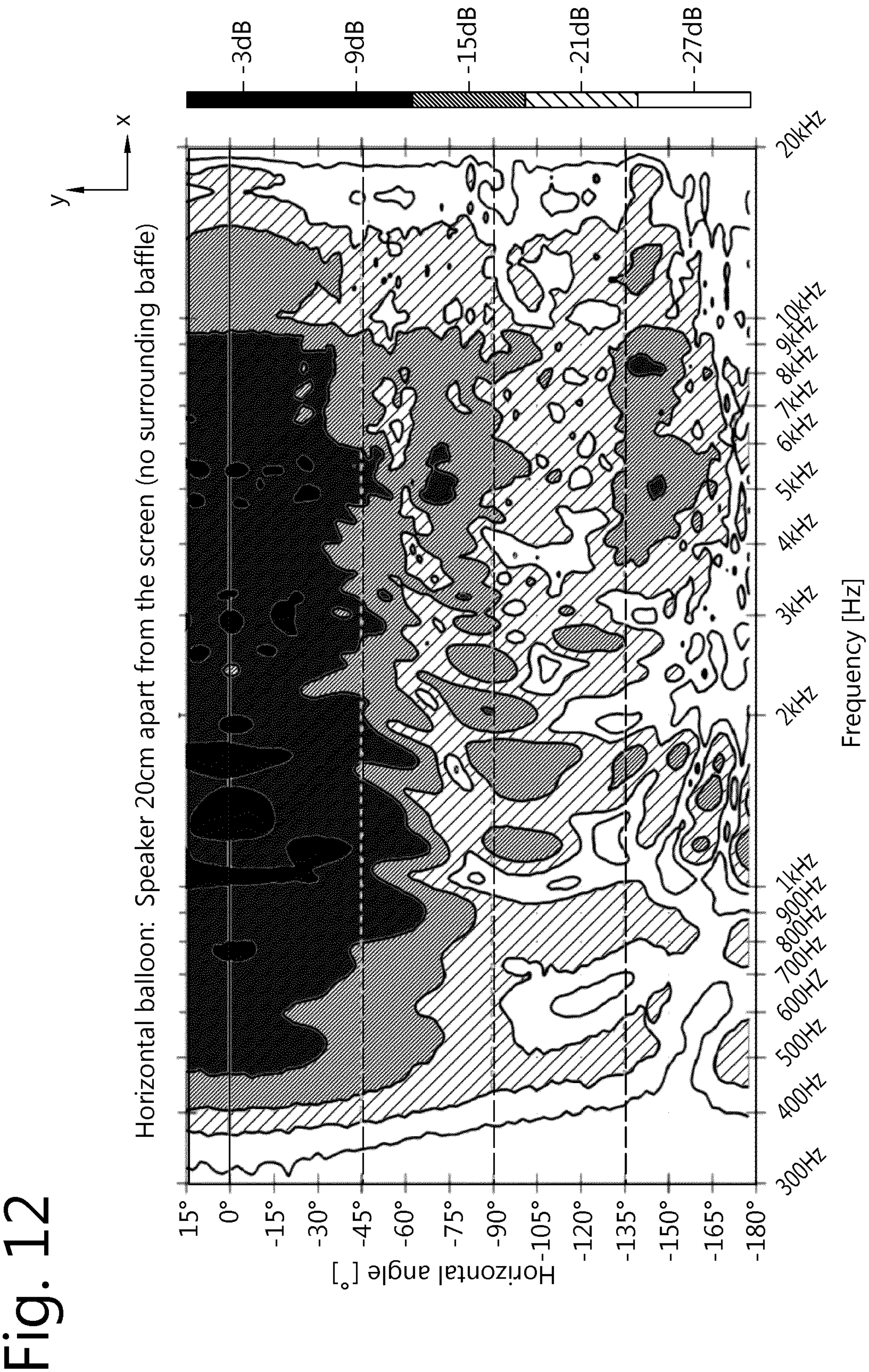

FIG. 12 shows the normalized horizontal radiation balloon (absolute magnitude spectrum) of the speaker when the distance between the speaker and the perforated standard cinema screen was 20 cm. Compared with FIG. 11 side lobes appear. The first one to the side of the screen sample (which is seen between −60° and −105°). The second one is caused by the energy reflected back on the screen (between −130° and −165°).

Figure 13:
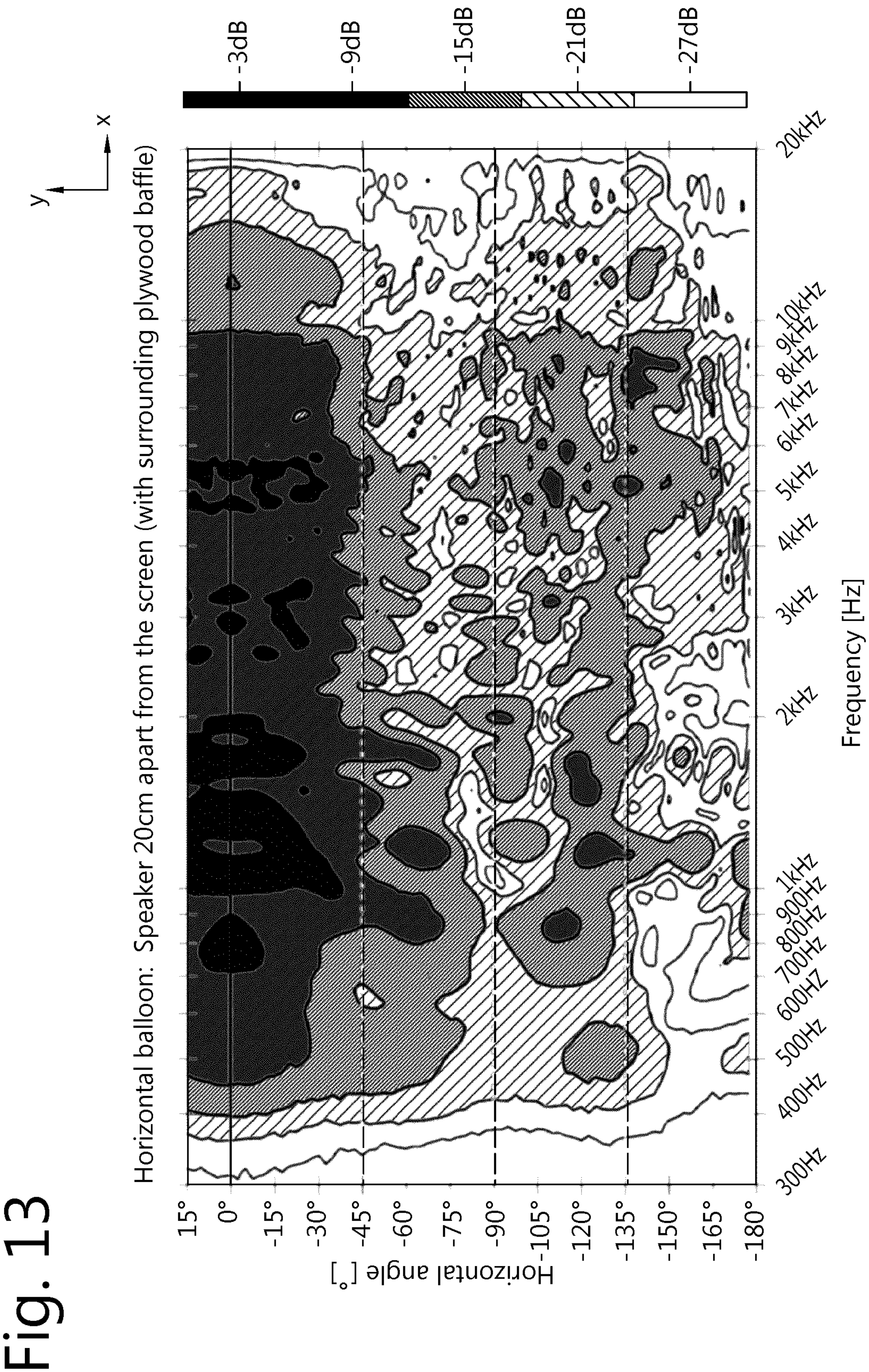

FIG. 13 shows normalized horizontal radiation balloon (absolute magnitude spectrum) of the speaker when the distance between the speaker and the perforated standard cinema screen was 20 cm and a plywood frame (baffle) was mounted around the screen to simulate the continued screen surface.

There are side lobes visible again, compared to FIG. 13. In this case the first side lobe if shifted to higher angles (between −90° and 130°), and the second one represents the energy reflected back (between 130° and 165°).

The invention claimed is:

1. A system for providing visual and acoustical signals, comprising:

a light emitting display having light sources and a display surface, and perforations extending perpendicularly to the display surface and disposed between the light sources, and at least one loudspeaker positioned behind the light emitting display, wherein each of the perforations comprise a non-cylindrical shape, wherein an amount of open surface caused by each of the perforations is smaller on the display surface in which the light sources are disposed than on a back side of the light emitting display positioned toward the at least one loudspeaker and wherein the open surfaces of the perforations on the side of the light sources occupy at least 5% of an area of the light emitting display for sound passing through.

2. The system according to claim 1, wherein the perforations have a truncated cone shape.

3. The system according to claim 1, wherein the perforations have a concave shape.

4. The system according to claim 1, wherein the perforations have a convex shape.

5. The system according to claim 1, wherein the perforations have non-circular openings.

6. The system according to claim 1, wherein the perforations have at least two sections with different shapes.

7. The system according to claim 6, wherein at least one perforation section has a truncated cone shape.

8. The system according to claim 6, wherein at least one perforation section has a concave shape.

9. The system according to claim 6, wherein at least one perforation section has a convex shape.

10. The system according to claim 6, wherein at least one perforation section has a non-circular opening.

11. A system for providing visual and acoustical signals, comprising:

a light emitting display having light sources and a display surface, and perforations extending perpendicularly to the display surface, at least one loudspeaker having a displacement amplitude and a frequency range of 5 kHz to 30 kHz, wherein each of the perforations comprise a conical shape and are disposed between the light sources, wherein an amount of open surface caused by each of the perforations is smaller on the display surface in which the light sources are disposed than on a back side of the light emitting display positioned toward the at least one loudspeaker, wherein the at least one loudspeaker is placed immediately behind the display so that when the at least one loudspeaker is positioned at a maximum displacement amplitude, the at least one loudspeaker is in contact with the display.

12. The system according to claim 11, wherein the perforations have a truncated cone shape.

13. The system according to claim 11, wherein the perforations have non-circular openings.

14. The system according to claim 11, wherein the perforations have at least two sections with different shapes.

15. A system for providing visual and acoustical signals, comprising:

a light emitting display having light sources, a display surface and perforations extending perpendicularly to the display surface, at least one loudspeaker having a displacement amplitude and a frequency range of 0.1 kHz to less than 5 kHz, wherein each of the perforations comprise a conical shape and are disposed between the light sources, wherein an amount of open surface caused by each of the perforations is smaller on the display surface in which the light sources are disposed than on a back side of the light emitting display positioned toward the at least one loudspeaker, wherein the at least one loudspeaker is placed immediately behind the display so that when the at least one loudspeaker is positioned at a maximum displacement amplitude, the at least one loudspeaker separated from the display by 1 mm to 15 cm.

16. The system according to claim 15, wherein the perforations have a truncated cone shape.

17. A method for providing visual and acoustical signals, using a light emitting display having light sources and a display surface, and perforations extending perpendicularly to the display surface and disposed between the light sources, wherein each of the perforations comprise a non-cylindrical shape, wherein an amount of open surface caused by each of the perforations is smaller on the display surface in which the light sources are disposed than on a back side of the light emitting display positioned toward the at least one loudspeaker and wherein the open surfaces of the perforations on the side of the light sources occupy at least 5% of the area of the light emitting display for sound passing through further comprising placing at least one loudspeaker behind the light emitting display.

18. A method for providing visual and acoustical signals, comprising a light emitting display having light sources and a display surface, and perforations extending perpendicularly to the display surface, wherein the perforations comprise a conical shape and are disposed between the light sources, the method comprising:

placing at least one loudspeaker immediately behind the display, the at least one loudspeaker having a displacement amplitude so that when the at least one loudspeaker is positioned at a maximum displacement amplitude, the at least one loudspeaker is in contact with the display, the at least one loudspeaker emitting sound at a frequency range of 5 kHz to 30 kHz, wherein an amount of open surface caused by each of the perforations is smaller on the display surface in which the light sources are disposed than on a back side of the light emitting display positioned toward the at least one loudspeaker.

* * * * *